United States Patent [19]
Ash

[11] Patent Number: 5,955,019
[45] Date of Patent: Sep. 21, 1999

[54] SOLUTION SPINNING POLYKETONE FIBERS

[75] Inventor: Carlton Edwin Ash, Sugar Land, Tex.

[73] Assignee: Shell Oil Company, Houston, Tex.

[21] Appl. No.: 09/128,080

[22] Filed: Aug. 3, 1998

Related U.S. Application Data

[60] Provisional application No. 60/061,135, Oct. 6, 1997.

[51] Int. Cl.$^6$ .............................. D01D 5/06; D01D 5/12; D01F 6/26
[52] U.S. Cl. ........................................ 264/203; 264/210.8
[58] Field of Search ................................... 264/203, 210.8

[56] References Cited

U.S. PATENT DOCUMENTS

| | | | |
|---|---|---|---|
| 2,648,646 | 8/1953 | Stanton et al. | 260/29.6 |
| 4,618,630 | 10/1986 | Knobel et al. | 521/105 |
| 4,808,699 | 2/1989 | van Broekhoven et al. | 528/392 |
| 4,868,282 | 9/1989 | van Broekheven et al. | 528/392 |
| 4,880,903 | 11/1989 | van Broekhoven et al. | 528/392 |
| 4,880,904 | 11/1989 | Kinneberg et al. | 528/392 |
| 5,045,258 | 9/1991 | van Breen et al. | 264/203 X |
| 5,194,210 | 3/1993 | Lommerts et al. | 264/203 X |
| 5,205,965 | 4/1993 | Uetani et al. | 252/500 |
| 5,407,982 | 4/1995 | Ash | 524/106 |
| 5,486,581 | 1/1996 | Ash | 525/539 |

FOREIGN PATENT DOCUMENTS

| | | |
|---|---|---|
| 2042414 | 9/1980 | United Kingdom . |

OTHER PUBLICATIONS

Fiber Chemistry, Handbook of Fiber Science and Technology: vol. IV, M. Lewin and E. Pearce, pp. 171, 224–249 (undated).

Zinc Compounds, Thomas B. Lloyd, Walter Showak, vol. 24, pp. 851–863 (undated).

*Primary Examiner*—Leo B. Tentoni
*Attorney, Agent, or Firm*—Todd F. Volyn

[57] ABSTRACT

A process for preparing filaments of polyketones which can be formed into various fibers is presented. The process involves preparing a solution of polyketone in a solvent, passing the solution through a die to produce a strand, coagulating the strand to produce a filament, removing solvent from the presence of the filament, and subsequently drawing the filament. The solvents are zinc and lithium based solutions.

10 Claims, No Drawings

SOLUTION SPINNING POLYKETONE FIBERS

This application claims the benefit of U.S. Provisional Application Ser. No. 60/016,135, filed Oct. 6, 1997, the entire disclosure of which is hereby incorporated by reference.

BACKGROUND OF THE INVENTION

This invention relates to the production of fibers of alternating aliphatic polyketones.

Polymers of carbon monoxide and ethylenically unsaturated hydrocarbons commonly referred to as aliphatic alternating polyketones (hereafter, "polyketones") are now well known. High molecular weight alternating aliphatic polyketones are of considerable interest because they exhibit a good overall set of physical and chemical properties. This class of polymers is disclosed in numerous U.S. patents assigned to Shell Oil Company exemplified by U.S. Pat. No. 4,880,903 and 4,880,904 which are incorporated herein by reference. Fibers made from polyketones can exhibit excellent properties such as tenacity, dimensional stability, hydrolytic stability, and resistance to abrasive wear.

A process for preparing fibers from polyketones is described in U.S. Pat. No. 5,045,258 which is incorporated herein by reference. This process employs hexaflouroisopropanol (HFIPA), m-cresol, and mixtures thereof as solvents for the polyketones. Until the present, these were the only materials known to be useful as solvents for polyketones. Solvents such as these present handling difficulties among other problems. U.S. Pat. No. 5,194,210 proposes solution spinning of polyketone fibers. The patent proposes that a number of organic compounds can be used to dissolve the polymer. A mixture of such solvents is said to be useful in this process. The mixture includes solvents such as ethylene carbonate or propylene carbonate and an aromatic alcohol fee of alkyl radical substituents such as resorcinol, phenol, and hydroquinone.

It has now been found that certain concentrated zinc and lithium-based preparations completely dissolve polyketones at room temperature without significantly altering the polymer backbone. These zinc and lithium-based materials can be used as solvents for producing polyketone fibers. This considerably expands the range of methods for preparing polyketone fibers.

SUMMARY OF THE INVENTION

The process of this invention is a technique for preparing filaments of polyketones which can be formed into various fibers. The process involves preparing a solution of polyketone in a solvent, passing the solution through a die to produce a strand, coagulating the strand to produce a filament, removing solvent from the presence of the filament, and subsequently drawing the filament.

The solvents useful in the process of this invention are comprised of $ZnX_2$ and LiY, wherein X is selected from the group consisting of Cl, Br, and I and Y is selected from the group consisting of Br, I, and SCN. The solvents are prepared as aqueous and/or polar organic solutions.

DETAILED DESCRIPTION OF THE INVENTION

The polyketone polymers which are employed in this invention are of an alternating structure and contain substantially one molecule of carbon monoxide for each molecule of ethylenically unsaturated hydrocarbon. It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an -olefin such as propylene. Additional monomers can also be used and still come within the scope of polyketone polymers described herein. That is, polyketone polymers can be made from four, five, or more combinations of monomers. Such polyketone polymers are aliphatic in that there is an absence of aromatic groups along the polymer backbone. However, alternating polyketones may have aromatic groups substituted or added to side chains and yet still be considered alternating aliphatic polyketones. Moreover, the polyketones used in this invention can be blends with any number of other polymers and materials. Some blends could incorporate aromatic materials and polymers. Nevertheless, the polyketone polymer component is still considered to be of the alternating aliphatic type.

When the preferred polyketone terpolymers are employed, there will be within the terpolymer at least about 2 units incorporating a moiety of ethylene for each unit incorporating a moiety of the second or subsequent hydrocarbon. Preferably, there will be from about 10 units to about 100 units incorporating a moiety of the second hydrocarbon. The polymer chain of the preferred polyketone polymers is therefore represented by the repeating formula

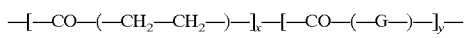

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$—CH$_2$—)— units and the —CO—(—G)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175 C to about 300 C, more typically from about 210 C to about 270 C. The polymers have a limiting viscosity number (LVN), measured in m-cresol at 60 C in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of aqueous environments. This is in contrast to a material such as nylon 6,6 which suffers the consequences of both hydrolysis and more severe plasticization.

Preferred methods for the production of the polyketone polymers are illustrated by U.S. Pat. No. 4,808,699 and 4,868,282 to Van Broekhoven, et. al. which issued on Feb. 28, 1989 and Sep. 19, 1989 respectively and are incorporated herein by reference. U.S. Pat. No. 4,808,699 teaches the production of alternating polymers by contacting ethylene and carbon monoxide in the presence of a catalyst comprising a Group VIII metal compound, an anion of a nonhydrohalgenic acid with a pKa less than 6 and a bidentate phosphorous, arsenic or antimony ligand. U.S. Pat. No. 4,868,282 teaches the production of random terpolymers by contacting carbon monoxide and ethylene in the presence of one or more hydrocarbons having an olefinically unsaturated group with a similar catalyst.

A polyketone solution, as the term is used throughout this specification, is a solution of polyketone dissolved in a liquid solvent without significant change to the polymer backbone. That is, a polyketone solution comprises polyketone, identifiable as such, in the liquid state. Standard means of characterizations such as NMR will readily reveal that the solution contains alternating aliphatic polyketone.

The solvents of this invention are prepared as solutions and dissolve the polyketone under dissolution conditions. These dissolution conditions include solvent ion concentration, concentration of polyketone in solvent, and temperature. The solvents of this invention are comprised of $ZnX_2$ and LiY dissolved in water and/or polar organic medium. Water is the most preferred medium in which the solvents are prepared. Lower alcohols such as methanol are the most preferred polar organic medium. Other polar organic media can include ketones, amides, esters, lactams, lactones, and the like. No special steps or methods are necessary to prepare the solvent solutions of this invention. They are easily prepared by any person of ordinary skill according to well known methods. Concentrations of polyketone relative to solvent is less than about 25% wt (based upon total weight of polyketone and solvent).

When the solvent is an aqueous solution of LiBr or LiI, the salt (ion) concentration must be greater than about 56% wt (based on total weight of water and salt) at 60° C. As one increases the temperature, the salt (ion) content of the solvent concentration can be lowered. Thus, at 95° C. one may use a salt (ion) concentration of greater than about 53% wt (based on total weight of water and salt) LiBr, to completely dissolve the polymer. For practical purposes, a linear relationship between solvent concentration and temperature can generally be interpolated between these concentrations and temperatures and can be extrapolated to the practical limits of solubility of LiBr. LiBr and LiI are the most preferred solvents.

When the solvent is an aqueous solution of $ZnCl_2$, the salt (ion) concentration must be greater than about 61% wt (based on total weight of water and salt) at 23° C. As one increases the temperature, the salt (ion) content of the solvent concentration can be lowered. Thus, at 95° C. one may use a salt (ion) concentration of greater than about 56% wt (based on total weight of water and salt) $ZnCl_2$, to completely dissolve the polymer. For practical purposes, a linear relationship between solvent concentration and temperature can generally be interpolated between these concentrations and temperatures and can be extrapolated to the practical limits of solubility of $ZnCl_2$. When the solvent is an aqueous solution of $ZnBr_2$, the salt (ion) concentration must be greater than about 70% wt (based on total weight of water and salt) at 60° C. When the solvent is an aqueous solution of $ZnI_2$, the salt (ion) concentration must be greater than about 59% wt (based on total weight of water and salt) at 60° C. $ZnCl_2$ is the most preferred of the zinc-based solvents.

The solutions of this invention are prepared by dissolving polyketone in the solvents described above. Some addition of mixing power is helpful but this merely accelerates dissolution and does not cause it. No special methods or techniques are necessary. It is preferred that a solution of appropriate concentration of solvent be prepared for the given operating temperature range as described above. Quantities of solvent solution are prepared such that there will be at least a minimal excess of concentration of solvent relative to polyketone according to the prescribed solvent/polyketone ratio described above. Solutions so formed are generally stable and may be stored in any type of vessel which does not permit osmosis, reaction, leaching, or evaporation of solvent solution.

Solution spun filaments are made by spinning a solution of polyketone in the solvent through a die. The solution spun filament is made by forcing the organic solvent containing the polyketone through the orifice of the die. The orifice of the die will typically be round, but can also be of other desired geometries. Dies have orifices of varied shape can be utilized to produce filaments having a wide variety of cross sectional designs, for example, round, square, rectangular, or elliptical. For instance, a die having a rectangular orifice can be utilized to produce a filament which is essentially in the form of a film. It is generally convenient to utilize a die having an orifice which is essentially circular. The orifice of such dies will typically have a diameter which is within the range of about 30 to about 400 microns. In most cases, it is preferred for such orifices to have a diameter which is within the range of about 40 microns to about 200 microns. Spinnerets which are equipped with multiple holes can be used in manufacturing multifilament yarns.

The polyketone solution is forced through the die at a rate which is sufficient to attain a spinning speed of about 1 meter per minute to about 1000 meters per minute. Typically, the spinning speed is between about 2 meters per minute to about 400 meters per minute. It is desirable to utilize the fastest possible spinning speed which does not result in unsatisfactory uniformity. Higher spinning speeds are also desirable because they result in higher throughputs and better productivity. For this reason, spinning speeds in excess of 1000 meters per minute would be desirable if uniformity and other desired properties can be maintained.

The polyketone solution is forced through the die utilizing an adequate pressure to attain the spinning speed desired. The polyketone solution will typically be solution spun into the solution spun filament at a temperature which is within the range of about 20° C. to about 180° C. Higher or lower temperatures can be utilized but are not preferred.

It is preferred that most of the solvent is removed from the polyketone solution after passage through the die. This can be accomplished through the use of a spinning bath containing a nonsolvent such as water and/or polar organic solvent. This coagulates the polyketone filament. It is further preferred to remove additional solvent prior to drawing. Removal of the solvent system minimizes the amount of chain relaxation which can occur and accordingly helps to maintain chain orientation.

The ability to utilize aqueous solvent solutions with this invention provides considerable process advantages in this regard. In a preferred process of this invention, polyketone fiber is removed from solution by reducing the concentration of solvent such that it is outside of the ranges required for dissolution at a given temperature. Thus, for example, polyketone can be removed from an aqueous solution of polyketone in $ZnCl_2$ by reducing the $ZnCl_2$ concentration to less than 61% wt at 23° C. This can be done through the addition of water in the spinning bath described above. The polyketone is then recovered as a filament.

After the solution spun filament has been prepared and preferably after solvent removal, it is subjected to a drawing procedure. During the drawing procedure the solution spun filament is drawn to a total draw ratio of at least about 1:1 to 50:1. The total draw ratio will typically be within the range of about 15:1 to about 20:1. It is advantageous to utilize relatively high draw ratios to maximize the tensile strength and modulus of the polyketone filament being produced.

The drawing procedure can be carried out in a single drawing stage or preferably in multiple stages. Typical drawing temperatures are from 23° C. to 260° C. Additional drawing steps can also be utilized to attain the desired total draw ratio.

The invention is further described in the following non-limiting examples.

EXAMPLE 1 (Polyketone Formation)

A terpolymer of carbon monoxide, ethylene, and propylene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.75 measured at 60° C. in m-cresol.

EXAMPLE 2 (Dissolution)

Polymer produced according to Example 1 was injection molded into ASTM D638, type V tensile bars weighing about 1.75 gms/bar. A tensile bar was submerged in a glass jar containing about 50 ml of a 65% wt (based on weight of salt (ion) plus water) aqueous $ZnCl_2$ solutions at about 60° C. for 120 hours. The polymer completely dissolved. $C^{13}$ NMR analysis of the solution revealed the presence of polyketone without any change in molecular structure of the polymer.

EXAMPLE 3 (Filament Formation)

A polyketone solution was formed as in Example 2. About 10 ml were drawn into a hypodermic syringe having an 18 guage needle. The liquid was then ejected from the syringe and a polyketone strand was coagulated in a water bath by manually drawing the strand across the bath. The strand was then further rinsed with water. This produced filament which ranged in diameter from about 0.05 mil to about 20 mils. The strands were then dried at about 60° C. in vacuum. The strands were then manually postdrawn.

EXAMPLE 4 (Fiber Formation-Prophetic)

Polyketone as described in Example 1 is dissolved in a 62% wt aqueous solution of $ZnCl_2$ at 60° C. The solution is stirred until a homogeneous polymer solution is obtained. The total polyketone concentration of the solution is about 7% wt (based on weight of polymer and solvent). The polymer solution is spun through a spinneret having a capillary diameter of 250 microns into a spinning bath containing water to coagulate and produce a yarn. The yarn is then washed free of solvent, wound onto a spool, and dried. The yarn is then drawn at 180° C. and at draw ratio of 20:1. The fiber so produced has a tenacity of about 1.5 GPa, a modulus of about 20 Gpa, and an elongation at break of about 7.5%.

I claim as my invention:

1. A process for producing a filament comprising preparing a polyketone solution in a solvent comprising $ZnX_2$ or LiY, passing the solution through a die to produce a strand, coagulating the strand to produce a filament, removing solvent from the presence of the filament, and subsequently drawing the filament; wherein X is selected from the group consisting of Cl, Br, and I and Y is selected from the group consisting of Br, I and SCN.

2. The process of claim 1 wherein the solvent is aqueous $ZnCl_2$.

3. The process of claim 2 wherein the solvent concentration is greater than about 61% wt (based on total weight of solvent solution) solution.

4. The process of claim 1 wherein the solvent is aqueous $ZnBr_2$.

5. The process of claim 1 wherein the solvent is aqueous $ZnI_2$.

6. The process of claim 1 wherein the solvent is formed in a polar organic medium.

7. The process of claim 6 wherein the solvent is formed in methanol or ethanol.

8. A process for producing a polyketone filament which comprises (1) spinning a solution of polyketone in a solvent through a die to produce a solution spun filament, wherein the solvent is $ZnX_2$ or LiY, X is Cl, Br, or I, Y is Br or SCN, and (2) subsequently drawing the solution spun filament.

9. The process of claim 8 wherein the filament is drawn to a total draw ratio of at least about 1:1 to about 50:1.

10. The process of claim 9 where in the total draw ratio is at least about 15:1.

* * * * *